Feb. 27, 1945.    E. SCHWEIZER    2,370,263
SCREEN
Filed April 18, 1942
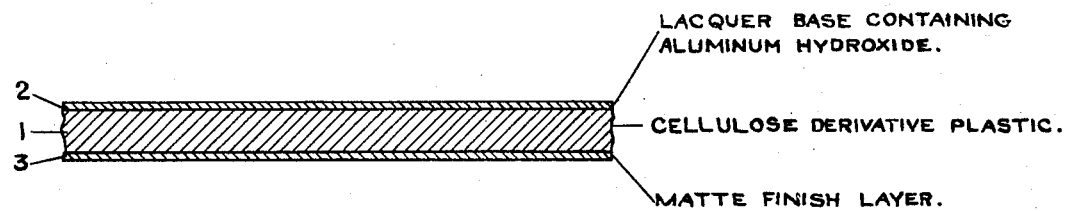
INVENTOR.
ERNEST SCHWEIZER.

Patented Feb. 27, 1945

2,370,263

UNITED STATES PATENT OFFICE 2,370,263

SCREEN

Ernest Schweizer, East Orange, N. J., assignor to Celanese Corporation of America, a corporation of Delaware Application April 18, 1942, Serial No. 439,557

8 Claims. (Cl. 88—28.93)

This invention relates to projection screens and relates more particularly to a process for treating plastic sheets to render them suitable for use as rear projection motion picture and lantern slide screens.

In rear projection motion picture machines it has been the practice to employ screens made of plastic sheets, such as sheets made of or containing cellulose acetate, having various finishes thereon. The use of such plastic sheets has not been wholly satisfactory due, among other things, to the fact that the finish applied to the rear surface thereof (i. e., the one towards the projector) failed to prevent light from being reflected back to the projector and thus lost to the image. Moreover, the front surface (the one toward the observer) of the sheet reflected light from sources external to the projector (such as light from windows, incandescent lamps, etc.,) into the observers' eyes thus obscuring the detail of the projected image. A further difficulty was due to the fact that the treatment of the sheet failed to overcome the natural yellowness of the light source used in the projector and therefore failed to produce a white image.

Another factor which contributed to lower the efficiency of the plastic sheet screens was that the treatment, i. e., the finish, did not give sufficient diffusion to kill the so-called "hot spot," that is, the bright image of the filament of the projection lamp as it is seen directly through the screen on the optical axis of the projector. This lack of diffusion also made the image intensity fall off too rapidly as the observer moved off to the side of the screen, away from the optical axis.

It is an object of this invention to provide an improved rear projection screen which will be free from the above mentioned and other disadvantages and which will be especially efficient in operation.

Another object of this invention is to provide a rear projection screen of plastic sheet material having thereon a finish or finishes adapted to produce diffusion of projected light whereby there is obtained a sharp image and a relatively high transmission of the diffused light without substantial back reflection.

It is also an object of this invention to provide a rear projection screen that has good wearing qualities, is not scratched easily, may be rolled up and unrolled frequently without cracking or peeling and has other advantages.

A further object of this invention is to provide improved finishes which may be applied to the surfaces of plastic sheet material to prepare rear projection screens which will produce the desired detail of image, which will have high diffusing power and high light transmission and which finish will be substantially permanent.

Other objects of the invention will appear from the following detailed description.

On the accompanying drawing the figure is a partial section on an exaggerated scale showing one form of projection screen made in accordance with my invention.

In one aspect, the present invention comprises a rear projection screen made from a plastic sheet; preferably a derivative of cellulose plastic sheet, on only one surface of which is applied a finish which will produce high diffusion or projected light so as to kill the "hot spot," and which will not reflect back any of said light whereby the sharpness of the image is reduced. Such a finish is a lacquer preferably having as a base the derivative of cellulose of the plastic sheet or another derivative of cellulose and containing aluminum hydroxide or aluminum hydrate. Where both surfaces of the plastic sheet are treated with the finish there is loss of detail in the image. Accordingly, as stated above, only one surface has applied thereto the high diffusion finish. If desired, or found necessary, the front surface may be treated with a finish which prevents light from sources external from the projector from being reflected into the observers' eyes, obscuring the detail of the projected image.

The plastic sheet that forms the base of the projection screen is preferably a sheet of cellulose acetate in thicknesses of from 0.01 to 0.06 inch or over but it may be formed of any suitable other derivative of cellulose such as cellulose nitrate, cellulose nitrate-acetate, cellulose butyrate, cellulose acetate-butyrate and other organic esters of cellulose or cellulose ethers such as methyl cellulose, ethyl cellulose and benzyl cellulose. Laminated sheets may be employed, the laminae of which are of the same or different derivatives of cellulose. These sheets may be suitably plasticized and may contain compounds for absorbing any undesired light. These sheets may also contain dyes to offset or balance a color given off by the source of light or by the picture being projected. For instance, a small amount of blue dye, say Rhoduline Sky Blue, may be incorporated in the sheet to balance the natural yellow color of the incandescent lamp projector to give a clear white image. Where the film on which is printed the image to be projected or the type of light employed in the projection has a color characteristic, its complement may be incorporated in the plastic sheet so that the projected image will be black and white. Furthermore, if a color is desired in the image a dye of that color may be added to the plastic sheet, say, to give a red cast or a bronze cast to the image.

The plastic sheet may contain besides the derivative of cellulose suitable plasticizers or modifiers to produce pliability in those screens intended to be rolled up or rigidity in permanently mounted screens. Any suitable plasticizers may be employed in the preparation of various cellulose derivative sheets, the amount and type of plasticizer depending upon the desired properties of the screen. Among the cellulose derivative plasticizers which have been found suitable are dimethoxy ethyl phthalate, dimethyl phthalate, diethyl phthalate, triacetin, dibutyl tartrate, methyl phthalyl ethyl glycollate, para ethyl toluene sulphonamide, etc. Mixtures of these plasticizers and fire retardants, such as triphenyl phosphate, may also be employed. For certain inside uses water-soluble plasticizers may be employed, particularly those imparting flexibility such as, for example, isobutylene glycol and polyglycol derivatives, such as tri- or tetraethylene polyglycol esters and ethers. Where cellulose acetate butyrate is employed a particularly effective plasticizer is butyl phthalyl butyl glycollate, while the preferred plasticizers for ethyl cellulose are a mixture of ortho and paraethyl toluene sulphonamide, methyl or ethyl phthalyl ethyl glycollate and the chlorinated diphenyls sold under the trade name "Arochlors." However, dibutyl phthalate and tricresyl phosphate are also of value.

As stated above, the plastic sheet that forms the base of the projection screen is preferably a derivative of cellulose plastic sheet. However, sheets of other transparent plastic material may be employed, such as, for example, vinyl derivatives sold under the trade name "Vinylite," vinyl acetals sold under the trade name "Butacite," polymerized acrylic and methacrylic esters sold under the trade names "Lucite" and "Plexiglas," polymerized styrene sold under the trade name "Styron," polymerized vinylidene chloride sold under the trade name "Saran" and transparent synthetic rubbers sold under the trade names "Pliofilm" and "Koroseal."

Any of the plastic sheets described above are coated on one side, preferably the rear or projection side, with a lacquer containing aluminum hydroxide or, as it is sometimes termed, aluminum hydrate, dispersed in a lacquer base, such as a derivative of cellulose or other resin. The lacquer may contain from 2 to 4 parts by weight of aluminum hydroxide to each part of cellulose derivative and suitable plasticizers, thinners, precipitants, etc., to form a lacquer. The properties imparted to the lacquer by these effect materials is well understood in the art. A preferred lacquer is given by the following example which is not given with the intention of being limited thereto.

Example

Cellulose acetate, preferably the acetone-soluble variety
parts by weight.. 100
Methyl phthalyl ethyl glycollate ............do.... 50
Aluminum hydroxide pigment ................do.... 300
Acetone } 50:50 .................. Q. S. for proper spraying consistency.
Methyl Cellosolve
Blue dye ........................ Q. S. to neutralize any yellowness of lacquer and light from lamp.

The lacquer is applied to the surface of the plastic sheet in any suitable manner such as spraying, flowing, dipping, brushing, etc. Coatings applied by spraying have been found very satisfactory. Sufficient coatings to obtain the desired degree of diffusibility and light transmission are applied by spraying on the polished surface of a sheet of cellulose acetate or other derivative of cellulose. This coating produces an excellent diffusing surface characterized by high light transmission, high diffusing power and very good surface hardness. The sheet material may have applied thereto one to five or more coatings to build the diffusing power to the proper balance with the light transmitting power according to the intended use for which the screen is designed. For instance, three coatings are preferred for home motion picture screens, while four coatings are preferred for lecture-platform lantern slide screens. Other uses may require a lighter or a heavier coating. Each coating of lacquer applies about 0.075 c. c. of lacquer to the square inch of plastic sheet material when said lacquer is prepared with about 900 parts by weight of acetone/Methyl Cellosolve.

The side of the plastic sheet opposite the aluminum hydroxide coating may or may not be given a finish to reduce or eliminate reflection. For this purpose a lacquer having high transmission and low diffusion properties is preferred. A suitable non-glare finish may be produced on the screen by spraying it with one or two coats of a lacquer composed of:

| | Parts by weight |
|---|---|
| Cellulose acetate | 100 |
| Triphenyl phosphate | 15 |
| Diethyl phthalate | 15 |
| Ethyl alcohol | 50 |
| "Cellosolve" | 500 |
| Acetone | 2,600 |

In place of cellulose acetate any other suitable derivative of cellulose may be employed with the same or different plasticizers and solvents. In the illustration above "Cellosolve" acts as a diluent-precipitant to effect a matte or dull finish upon evaporation of the low boiling solvents. In general, the matte finish may be produced by applying to the sheet a lacquer containing a plasticized cellulose derivative containing a volatile active solvent, and a diluent non-solvent of less volatility which effects a precipitation of the cellulose derivative base upon evaporation of the active volatile solvent. This matte finish, however, has little or no diffusing effect, which effect is to be avoided as a diffusing surface on both sides of the sheet reduces greatly the sharpness of detail in the image especially as the observer moves to either side from directly in front of the screen. However, the finish need not be in the form of a coating but may be a matte effect embossed on the surface, for example, a paper, calf skin, etc., finish.

On the accompanying drawing there is shown diagrammatically one form of product produced by the process of this example wherein the sheet 1 of cellulose derivative plastic has a light-diffusing coating 2 produced from a lacquer containing aluminum hydroxide and a coating 3 of matte finish for reducing reflection.

The sheets described above are intended primarily for projection screens and especially rear projection screens. However, they have other important uses. The sheets may be employed wherein a high diffusing power and high light transmission are desired, such as, for instance, in lamp shades and covers with fluorescent lighting fixtures.

It is to be understood that the foregoing detailed description is given merely by way of illustration and that many variations may be made therein without departing from the spirit of my invention.

Having described my invention, what I desire to secure by Letters Patent is:

1. A projection screen comprising as a base a transparent plastic sheet having on one side thereof a coating containing aluminum hydroxide.

2. A projection screen comprising as a base a transparent plastic sheet containing an organic derivative of cellulose having on one side thereof a coating containing aluminum hydroxide.

3. A projection screen comprising as a base a transparent plastic sheet containing an organic derivative of cellulose having on one side thereof a coating containing aluminum hydroxide dispersed in a derivative of cellulose.

4. A projection screen comprising as a base a transparent plastic sheet containing an organic derivative of cellulose having on one side thereof a coating containing aluminum hydroxide dispersed in a derivative of cellulose and on the other side a coating containing a precipitated organic derivative of cellulose.

5. A projection screen comprising as a base a transparent plastic sheet containing cellulose acetate having on one side thereof a coating containing aluminum hydroxide dispersed in a derivative of cellulose and on the other side a coating containing a precipitated organic derivative of cellulose.

6. A projection screen comprising as a base a transparent plastic sheet containing cellulose acetate having on one side thereof a coating containing aluminum hydroxide.

7. A projection screen comprising as a base a transparent plastic sheet containing cellulose acetate having on one side thereof a coating containing aluminum hydroxide dispersed in a derivative of cellulose.

8. A projection screen comprising a transparent plastic sheet containing cellulose acetate and having on one side thereof a coating containing one part by weight of cellulose acetate and three parts by weight of aluminum hydroxide.

ERNEST SCHWEIZER.